Patented Apr. 19, 1938

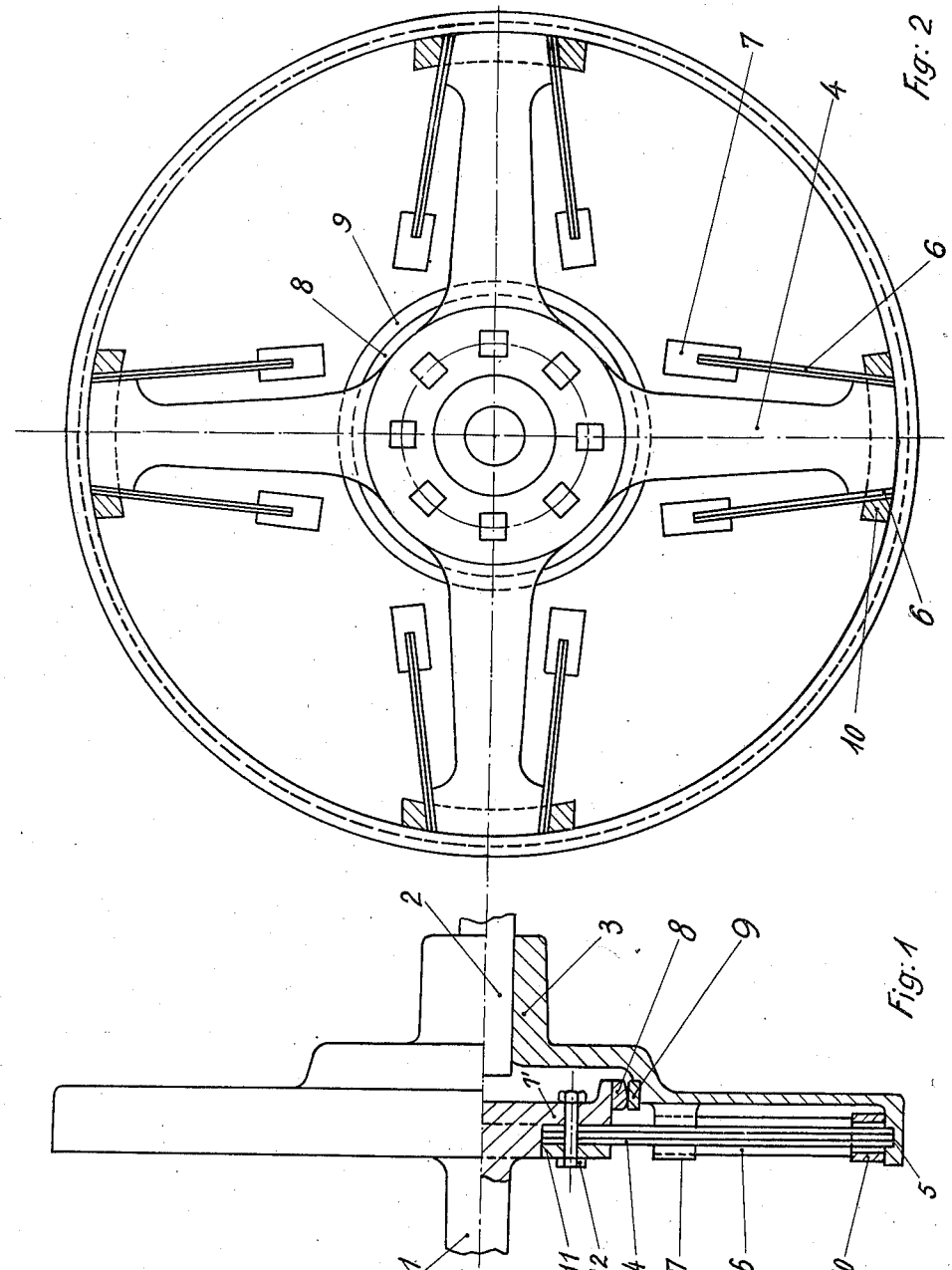

2,114,570

UNITED STATES PATENT OFFICE 2,114,570

SHAFT COUPLING

Constant Renaud, Mont-sur-Marchienne, Belgium, assignor to Ateliers de Constructions Electriques de Charleroi, Brussels, Belgium, a corporation of Belgium Application July 12, 1937, Serial No. 153,287
In Belgium July 22, 1936

8 Claims. (Cl. 64—15)

This invention relates to elastic couplings for shafts.

In order to transmit power from one shaft to another, it may be necessary to employ couplings which fulfill the following conditions:

(1) To maintain the centering of the axes in the vicinity of their connection.

(2) To permit axial and angular displacements of one shaft relatively to the other.

(3) To ensure the elastic transmission of the torque.

(4) To cushion the torsional oscillations of one shaft relatively to the other.

The present invention has reference to an improved coupling which complies with the above mentioned conditions and is of very small axial length.

Upon the accompanying diagrammatic drawing, to which reference is made in the following description, there has been shown one example of carrying out this invention; in this drawing:—

Fig. 1 is an elevation of the improved coupling, the lower part being shown in section upon the centre line of Fig. 2.

Fig. 2 is an elevation at right angles to Fig. 1.

In both these figures the same reference letters designate the same elements.

The shaft 1 is required to transmit its power to the shaft 2. The shaft 1 carriers an assembly flange 1' intended to receive an elastic member. This elastic member, in the shape of a star having for example, four arms 4, is composed of thin spring-steel plates which are superposed, hollowed at the center for mounting on the shaft 1 and clamped by means of bolts 12 between the assembly flange 1' and a washer plate 11. The extremities of the branches or arms 4 are engaged in a circular groove 5 formed in the inner wall of a housing 3 made fast to the shaft 2, this housing being of any suitable shape. In order to transmit the torque and to ensure a uniform distribution of the load over the elastic member, the arms 4 bear at their ends upon elastic abutments.

By way of example, Figs. 1 and 2 show abutments or stops constituted by straight-bladed springs 6. These springs, arranged symmetrically in relation to each arm, are flexible in the direction of rotation of the coupling and are fitted tightly at one extremity in supports 7 fast with the housing 3.

The arms 4 bear in proximity to the groove 5 upon the free end of the springs 6. The two groups of springs 6 corresponding to each arm 4 are connected by a stirrup 10 of which the function is a double one;

First to cause all the springs 6 to work at the same time; and

Second to generate, by contact with the housing 3, braking actions capable of sufficiently damping the torsional oscillations. In fact, the stirrup 10 is free to move radially and centrifugal force holds it against the interior wall of the housing 3, so that in case of torsional oscillations the relative rotations of the elastic element (and of the stirrups 10) in relation to the housing 3 will have for effect to cause the frictional work between the contact surfaces of the stirrup 10 and the housing 3. A favorable circumstance is that the amount of friction increases with the speed of rotation.

The application in which the stirrup 10 contributes to damp the torsional oscillations has been given only by way of example. It is obviously possible to attain the same result by any other arrangement in which shoes, fast with the elastic element in its movement of rotation, are applied against the housing 3 either by centrifugal force or by springs acting in a direction radial of or parallel to the axis of rotation.

The centering of one shaft relatively to the other is ensured by means of two concentric rings 8 and 9 bearing one against the other, the interior ring 8 being spherical at its periphery and fast with the shaft 1 while the exterior cylindrical ring 9 is fast with the housing 3; these rings may be, for example, of nitrided steel.

It will be understood that such a coupling is particularly flexible in action; the axial or angular displacements of one shaft relatively to the other are obtained by the flexion of the thin spring-steel plates. The transmission of the torque is elastically ensured by the blades of the springs 6.

The principal advantages of this mode of transmission are:—

(a) Possible angular and axial displacements.

(b) Extremely small axial length or bulk.

(c) Elastic transmission of the torque.

(d) Uniform distribution of the loads over the arms of the elastic element.

(e) This coupling constitutes an excellent damping device, in fact the frictional work between the blades of the elastic element acts as a brake upon the axial oscillations, just as the frictional work between the blades 6 and also between the stirrup 10 and the housing 3 damps the torsional oscillations.

(f) It is suitable for the highest speeds.

It is naturally permissible, without departing from the scope of the invention, to arrange modifications acting practically in the same manner as the coupling described by way of example with reference to Figs. 1 and 2. Thus the elastic stops may be formed by helical springs, Belleville washers, rubber discs, bundles of thin blades arranged transversely or radially, or the like.

Further, it is obvious that for low speeds of rotation the rings 8 and 9 may be dispensed with, the centering of one shaft in relation to the other being ensured by means of the elastic element which bears at its periphery upon the interior surface of the housing 3.

What I claim is:—

1. An elastic shaft-coupling, comprising a star-shaped element secured to one shaft, a housing secured to the other shaft, said star-shaped element being constituted by thin elastic plates having a plurality of arms in engagement with said housing at their outer extremities, and elastic abutments fast with said housing, said star-shaped element having its arms in engagement with said abutments.

2. An elastic shaft-coupling comprising a star-shaped element secured to one shaft, a housing secured to the other shaft, said star-shaped element having a plurality of arms in engagement with said housing at their outer extremities, and elastic abutments fast with said housing, said abutments being constituted by spring blades secured to said housing at their inner extremities and having their outer extremities in engagement with the arms of said star-shaped element.

3. An elastic shaft-coupling comprising an element secured to one shaft, said element consisting of a plurality of elastic plates lying in planes perpendicular to the axis of said shaft, a second element secured to the other shaft, said second element being rotatably engaged by the peripheral extremities of said elastic plates, and elastic members secured to said second element, said elastic members engaging the peripheral extremities of said elastic plates, said elastic plates and elastic members cooperating to transmit torque between said shafts, and said elastic plates operating in flexion to resist axial and angular displacements between said shafts.

4. An elastic shaft-coupling comprising a star-shaped element secured to one shaft, a housing secured to the other shaft, said star-shaped element having a plurality of arms in engagement with said housing at their outer extremities, elastic abutments fast with said housing, said star-shaped element having its arms in engagement with said abutments, and a pair of concentric rings secured to the respective shafts, one of said rings having a part-spherical external periphery and the other of said rings having a cylindrical internal periphery, said external periphery fitting within said internal periphery.

5. An elastic shaft-coupling comprising a star-shaped element secured to one shaft, a housing secured to the other shaft, said star-shaped element having a plurality of arms in engagement with said housing at their outer extremities, elastic members fast with said housing, said elastic members being constituted by spring blades secured to said housing at their inner extremities and having their outer extremities in engagement with the arms of said star-shaped element, and a plurality of stirrups holding the outer extremities of said spring blades in engagement with said arms.

6. An elastic shaft-coupling comprising a star-shaped element secured to one shaft, a housing secured to the other shaft, said star-shaped element having a plurality of arms in engagement with said housing at their outer extremities, elastic members fast with said housing, said elastic members being constituted by spring blades secured to said housing at their inner extremities and having their outer extremities in engagement with the arms of said star-shaped element, and a plurality of stirrups holding the outer extremities of said spring blades in engagement with said arms, said stirrups being free to move in substantially radial directions and being pressed against the interior of said housing by centrifugal force during the rotation of said shafts.

7. An elastic shaft-coupling comprising a star-shaped element secured to one shaft, a housing secured to the other shaft, said star-shaped element having a plurality of arms in engagement with said housing at their outer extremities, elastic members fast with said housing, said elastic members being constituted by spring blades secured to said housing at their inner extremities and having their outer extremities in engagement with the arms of said star-shaped element, and means holding the outer extremities of said spring blades in engagement with said arms, said means being adapted to press against the interior of said housing by centrifugal force during the rotation of said shafts.

8. An elastic shaft-coupling comprising a star-shaped element secured to one shaft, a housing secured to the other shaft, said star-shaped element having a plurality of arms in engagement with said housing at their outer extremities, elastic members fast with said housing, said elastic members being constituted by spring blades secured to said housing at their inner extremities and having their outer extremities in engagement with the arms of said star-shaped element, and frictional means for damping relative angular movements of said shafts, said frictional means being controlled by centrifugal force during the rotation of said shafts.

CONSTANT RENAUD.